US011015759B2

(12) United States Patent
Sun et al.

(10) Patent No.: US 11,015,759 B2
(45) Date of Patent: May 25, 2021

(54) POWER TOOL AND KICKBACK DETECTION METHOD THEREFOR

(71) Applicant: Nanjing Chervon Industry Co., Ltd., Nanjing (CN)

(72) Inventors: Yongan Sun, Nanjing (CN); Ailong Zou, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 174 days.

(21) Appl. No.: 16/176,310

(22) Filed: Oct. 31, 2018

(65) Prior Publication Data

US 2019/0128474 A1 May 2, 2019

(30) Foreign Application Priority Data

Nov. 2, 2017 (CN) .......................... 201711065314.X

(51) Int. Cl.
| | |
|---|---|
| *F16P 3/00* | (2006.01) |
| *B25F 5/00* | (2006.01) |
| *B23B 45/02* | (2006.01) |
| *H02P 23/12* | (2006.01) |
| *H02P 23/20* | (2016.01) |
| *B23D 45/16* | (2006.01) |
| *B24B 23/02* | (2006.01) |
| *B27B 9/00* | (2006.01) |
| *B25D 16/00* | (2006.01) |
| *B23D 59/00* | (2006.01) |
| *F16P 7/02* | (2006.01) |
| *B23Q 11/04* | (2006.01) |

(Continued)

(52) U.S. Cl.
CPC ............... *F16P 3/00* (2013.01); *B23B 45/02* (2013.01); *B23D 45/16* (2013.01); *B23D 59/001* (2013.01); *B23Q 11/04* (2013.01); *B24B 23/028* (2013.01); *B25D 16/00* (2013.01); *B25F 5/001* (2013.01); *B27B 9/00* (2013.01); *F16P 7/02* (2013.01); *H02P 23/12* (2013.01); *H02P 23/20* (2016.02); *B25B 21/00* (2013.01); *B25D 17/24* (2013.01); *B25D 2250/201* (2013.01); *B25D 2250/221* (2013.01); *B25D 2250/265* (2013.01)

(58) Field of Classification Search
CPC .... F16P 3/00; F16P 7/02; B23D 45/16; B23D 59/001; B23Q 11/04; B25D 16/00; B25D 17/24; B25D 2250/201; B25D 2250/221; B25D 2250/265; B24B 23/028; B25F 5/001; B27B 9/00; B25B 21/00
USPC ............................................................. 173/1
See application file for complete search history.

(56) References Cited

U.S. PATENT DOCUMENTS

| | | | | |
|---|---|---|---|---|
| 2008/0110653 | A1* | 5/2008 | Zhang ................. | H02P 29/032 173/1 |
| 2012/0036725 | A1* | 2/2012 | Osborne ............... | B27B 17/083 30/383 |

(Continued)

*Primary Examiner* — Dariush Seif
(74) *Attorney, Agent, or Firm* — Greenberg Traurig, LLP

(57) ABSTRACT

A power tool and a detection method for the power tool. The detection method includes collecting acceleration data, via use of an acceleration sensor of the power tool, along a tangential direction of a rotation axis of a working portion of the power tool, determining whether a proportion of the collected acceleration data that exceeds a first acceleration threshold in a preset time window exceeds a preset value, and determining that a kickback occurs in the power tool when the proportion exceeds the preset value.

16 Claims, 7 Drawing Sheets

(51) Int. Cl.
    *B25D 17/24*     (2006.01)
    *B25B 21/00*     (2006.01)

(56) References Cited

U.S. PATENT DOCUMENTS

| | | | |
|---|---|---|---|
| 2014/0166323 A1* | 6/2014 | Cooper | F16P 3/148 |
| | | | 173/1 |
| 2014/0245872 A1* | 9/2014 | George | B27G 19/003 |
| | | | 83/62.1 |
| 2015/0360305 A1* | 12/2015 | Willgert | B27B 17/0025 |
| | | | 30/272.1 |
| 2016/0089810 A1* | 3/2016 | Padmanabhan | B27G 19/02 |
| | | | 83/13 |
| 2016/0354888 A1* | 12/2016 | Huber | F16D 48/06 |
| 2017/0057038 A1* | 3/2017 | Coleman | B23Q 11/0085 |
| 2017/0173749 A1* | 6/2017 | Stock | G08B 21/02 |
| 2017/0361449 A1* | 12/2017 | Goble | B25B 23/147 |
| 2018/0038546 A1* | 2/2018 | Nishimiya | B25F 5/00 |
| 2019/0013762 A1* | 1/2019 | Yamaguchi | B25F 5/00 |
| 2019/0061028 A1* | 2/2019 | Martinsson | A01G 23/08 |

* cited by examiner

POWER TOOL AND KICKBACK DETECTION METHOD THEREFOR

RELATED APPLICATION INFORMATION

This application claims the benefit under 35 U.S.C. § 119(a) of Chinese Patent Application No. CN201711065314.X, filed on Nov. 2, 2017, the disclosure of which is incorporated herein by reference in its entirety.

TECHNICAL FIELD

The present disclosure relates to power tool techniques and, in particular, to a power tool and a kickback detection method for the power tool.

BACKGROUND

Power tools, such as an electric drill, an electric angle grinder, an electric screwdriver and the like, all rely on the rotation of an electric motor to drive a working portion or accessory to work. For some power tools with high torque, such as an electric drill, a percussion drill, a high-power angle grinder and the like, the working portion, such as a drill bit or a grinding wheel, may be stuck in operation, causing a kickback.

Therefore, how to correctly detect the kickback of the power tool so as to control the power tool to stop working in the event of the kickback is an essential technology to enhance safety when using the power tool. However, since the power tool vibrates when the power tool works normally, how to accurately detect the kickback from the vibration is an urgent problem to be solved.

SUMMARY

The present disclosure provides a power tool and a detection method for the power tool, to improve the accuracy of the kickback detection for the power tool.

By way of example, the present disclosure provides a detection method for a power tool. The method includes: collecting acceleration data, detected by an acceleration sensor, of the power tool along a tangential direction of a rotation axis of a working portion; in response to the detected acceleration data exceeding a first acceleration threshold, determining whether a proportion of the acceleration data exceeding the first acceleration threshold in a preset time window exceeds a preset value; and determining that a kickback occurs in the power tool if the proportion exceeds the preset value.

The detected acceleration data may be a numeric signal.

In a further example, before responding to the detected acceleration data that exceeds a first acceleration threshold, it may be determined whether a proportion of the acceleration data exceeding the first acceleration threshold in a preset time window exceeds a preset value and the method may further include: filtering the acceleration data and discretizing the filtered acceleration data to obtain discrete data of acceleration; in response to the detected discrete data exceeding the first acceleration threshold, determining whether a proportion of the discrete data exceeding the first acceleration threshold in the preset time window exceeds the preset value.

In a further example, before responding to the detected acceleration data that exceeds the first acceleration threshold, it may be determined whether a proportion of the acceleration data exceeding the first acceleration threshold in the preset time window exceeds the preset value and the method may further include: low-pass filtering the acceleration data to obtain filtered acceleration data; in response to the filtered acceleration data exceeding a second acceleration threshold, determining whether a proportion of the filtered acceleration data exceeding the second acceleration threshold in the preset time window exceeds the preset value.

In a further example, after determining that a kickback occurs in the power tool, the method may further include: controlling the power tool to stop rotating.

Also described herein is a power tool including a housing, a power supply module, an electric motor, a control switch, a working portion, an acceleration sensor and a control module. The power supply module, the electric motor, the control switch, the acceleration sensor and the control module are disposed in the housing. The power supply module is electrically connected to the electric motor via the control switch and configured to supply power to the electric motor according to the control of the control switch to drive the electric motor to rotate. The electric motor is fixedly connected to the working portion and configured to drive the working portion to rotate when the electric motor is rotating. The acceleration sensor is configured to detect acceleration along a tangential direction of a rotation axis of the working portion when the working portion is rotating. The control module is electrically connected to the acceleration sensor and configured to collect acceleration data detected by the acceleration sensor, in response to the detected acceleration data exceeding a first acceleration threshold, determine whether a proportion of the acceleration data exceeding the first acceleration threshold in a preset time window exceeds a preset value, and determine that a kickback occurs in the power tool if the proportion exceeds the preset value.

In a further example, the detected acceleration data is a numeric signal.

In a further example, the control module may be configured to filter the acceleration data and discretize filtered acceleration data to obtain discrete data of the acceleration and in response to the detected discrete data exceeding the first acceleration threshold, determine whether a proportion of the discrete data exceeding the first acceleration threshold in the preset time window exceeds the preset value.

In a further example, the control module may be configured to low-pass filter the acceleration data to obtain filtered acceleration data and in response to the filtered acceleration data exceeding a second acceleration threshold, determine whether a proportion of the filtered acceleration data exceeding the second acceleration threshold in the preset time window exceeds the preset value.

In a further example, the control module may be configured to control the electric motor to stop rotating or control the power supply module to stop supplying power to the electric motor after determining that a kickback occurs in the power tool.

According to the power tool and the kickback detection method for the power tool provided by the present disclosure, acceleration data of the power tool in a tangential direction is collected by an acceleration sensor, and it is determined that a kickback occurs in the power tool when a proportion of the acceleration data exceeding the first acceleration threshold in a preset time window exceeds a preset value, thereby making the kickback detection more accurate and avoiding the influence of the vibration generated when the power tool is working normally.

DETAILED DESCRIPTION

The present disclosure will be further described in detail in conjunction with the drawings and various examples. It is to be understood that the examples set forth below are intended to illustrate and not to limit the invention hereinafter claimed.

Figure 1:
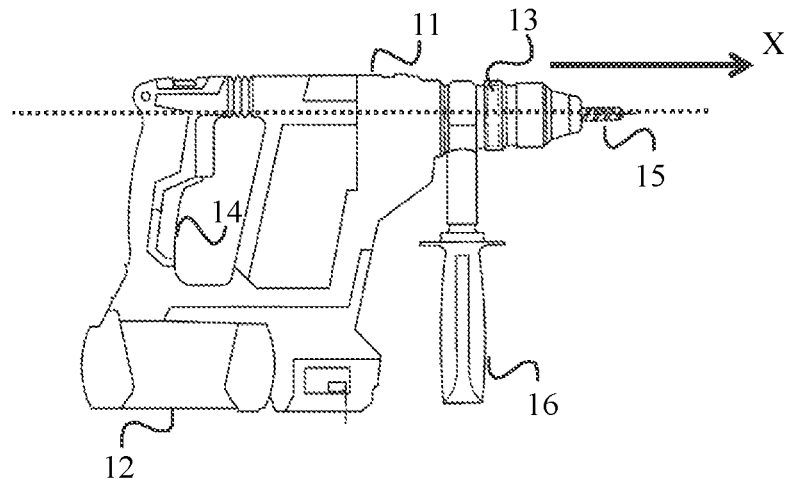
FIG. 1 is a side view of an example power tool.
Figure 2:
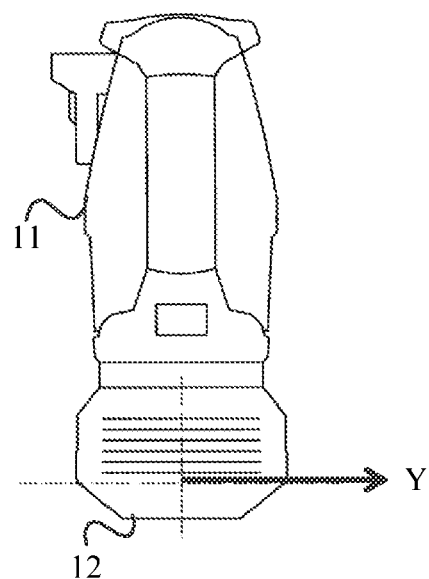
FIG. 2 is a rear view of the power tool of FIG. 1.

FIG. 1 and FIG. 2 are structural diagrams of an example power tool. FIG. 1 is a side view of the power tool and FIG. 2 is a rear view of the power tool. As shown in FIG. 1 and FIG. 2, the power tool includes a housing 11, a power supply module 12, an electric motor 13, a control switch 14 and a working portion 15. The power supply module 12, the electric motor 13 and the control module 14 are disposed in the housing 11. The power supply module 12 may be a storage battery, a power supply module or a power adapter connected to an alternating current (AC) power supply. In FIG. 1 and FIG. 2, the power supply module 12 is a storage battery. The power supply module 12 is electrically connected to the electric motor 13 via the control switch 14, and a part of the control switch 14 is disposed outside the power tool housing. When a user triggers the control switch 14, the power supply module 12 and the electric motor 13 are connected to drive the electric motor 13 to rotate. Since the power tool needs to be held by the user, the housing 11 may further include a handle 16 for the convenience of the user.

The control switch 14 may have one or more control positions. If the control switch 14 has one control position, the power supply module 12 just can drive the electric motor 13 to rotate in only one predetermined direction when the control switch 14 is triggered. In some tools, the control switch 14 has two control positions which are a counterclockwise rotation control position and a clockwise rotation control position, the power supply module 12 drives the electric motor 13 to rotate counterclockwise when the counterclockwise rotation control position of the control switch 14 is triggered; and the power supply module 12 drives the electric motor 13 to rotate clockwise when the clockwise rotation control position of the control switch 14 is triggered. If the control switch 14 has multiple control positions which respectively correspond to different speeds, the power supply module 12 drives the electric motor 13 to rotate at a speed corresponding to one of the multiple control positions that is triggered. The control switch 14 may also have different control positions corresponding to different speeds and different rotation directions (clockwise or counterclockwise), so that the electric motor 13 may be controlled to rotate at different speeds and in different directions. In addition, the control switch 14 may further be a stepless variable switch. The current outputted by the power supply module 12 to the electric motor 13 is determined or controlled by a force applied to the control switch 14. Different forces correspond to different currents outputted to the electric motor 13, thereby making the electric motor 13 rotate at different speeds.

The working portion 15 is fixedly connected to the electric motor 13 and the working portion 15 varies with the use of the power tool. For example, if the power tool is an electric drill, the working portion 15 may be drill bits with different specifications, and the working portion 15 is detachably, fixedly connected to the electric motor 13. If the power tool is an angle grinder, the working portion 15 is a grinding wheel. If the power tool is a circular saw, the working portion 15 is a circular saw blade. The rotation of the electric motor 13 drives the working portion 15 to rotate so as to complete different work by using the working portion 15.

The rotation of the power tool is along the axial direction of the electric motor, that is, along the axial direction of the working portion 15. The axial direction of the power tool is an X direction, and a Y direction in FIG. 2 is the tangential direction of the power tool. When the power tool is working, various vibrations inevitably occur. When the power tool is working normally, the vibrations exist in all directions and generally have a certain regularity. When the power tool is working and the working portion 15 is stuck at the construction site while the electric motor 13 is still rotating, the rotation of the working portion 15 is blocked, the power tool will encounter a kickback, and the power tool will encounter an unpredictable vibration.

Figure 3:
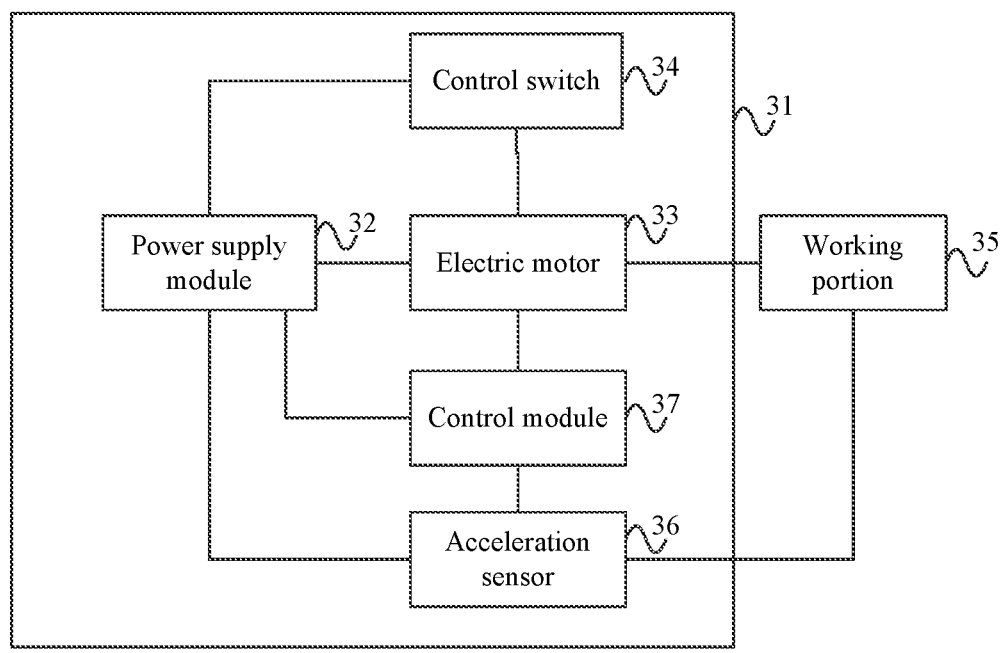
FIG. 3 is a structural diagram of the power tool of FIG. 1.

FIG. 3 is a structural diagram of an example power tool. FIG. 3 illustrates logical blocks of the power tool. The basic structure and appearance of the power tool are similar to the power tool shown in FIG. 1 and FIG. 2. The power tool in this example includes: a housing 31, a power supply module 32, an electric motor 33, a control switch 34, a working portion 35, an acceleration sensor 36 and a control module 37.

The power supply module 32, the electric motor 33, the control switch 34, the acceleration sensor 36 and the control module 37 are all disposed in the housing 31. The power supply module 32 is electrically connected to the electric motor 33 via the control switch 34 and configured to supply power to the electric motor 33 according to the control of the control switch 34 to drive the electric motor 33 to rotate. The electric motor 33 is fixedly connected to the working portion 35 and configured to drive the working portion 35 to rotate when rotating. The specific structures and functions of the housing 31, the power supply module 32, the electric motor 33, the control switch 34 and the working portion 35 are similar to those in the power tool shown in FIG. 1 and FIG. 2, which are not repeated herein.

On the basis of the power tool illustrated in FIG. 1 and FIG. 2, the power tool in this example further includes the acceleration sensor 36 and the control module 37. The acceleration sensor 36 is configured to detect acceleration along a tangential direction of a rotation axis of the working portion 35 when the working portion 35 is rotating. The acceleration sensor 36 may be disposed in any position within the housing 31, or the acceleration sensor 36 may be disposed outside the housing 31. The acceleration sensor 36 is fixed to the housing 31. Once the working portion 35 is fixedly connected to the electric motor 33, the axial direction of the working portion 35 is fixed, which is coaxial with the axial direction of the electric motor 33. Therefore, after the acceleration sensor 36 is fixed on the housing 31, a measurement direction of the acceleration sensor 36 is adjusted to be perpendicular to the axial direction of the electric motor 33 through a corresponding configuration, so that the acceleration sensor 36 can measure the acceleration data in the tangential direction of the rotation axis of the working portion 35. The acceleration sensor 36 may be any sensor capable of measuring acceleration, such as a microelectromechanical system (MEMS) acceleration sensor.

The control module 37 is electrically connected to the acceleration sensor 36 and configured to collect acceleration data detected by the acceleration sensor 36. The acceleration sensor 36 starts to continuously detect the acceleration data when the working portion 35 starts rotating. The control module 37 reads and analyzes the data detected by the acceleration sensor 36. When the detected acceleration data exceeds a first acceleration threshold, a determination process of the control module 37 is triggered. Since the power tool moves forward in the axial direction during working normally, the change of the tangential acceleration is relatively stable. Even if the power tool vibrates, the accelerations in various direction are substantially uniform. Therefore, a large and continuous acceleration generated in the tangential direction of the power tool means that the energy which the power tool should have consumed in the axial direction has been transferred to the tangential direction, that is, a kickback occurs. Therefore, when the control module 37 or detection module detects that the acceleration data exceeds the first acceleration threshold, a preset time window is started, and it is determined whether a proportion of the acceleration data exceeding the first acceleration threshold in a preset time window exceeds a preset value. If the proportion exceeds the preset value, it is determined that a kickback occurs in the power tool. The length of the preset time window is configured according to the characteristic of the power tool, such as 500 ms or 1 sec., and the preset value is also configured according to the characteristic of the power tool, such as 80% or 90%. That is, after the acceleration data is detected to exceed the first acceleration threshold for the first time, if 80% of the acceleration data within 500 ms is detected to exceed the first acceleration threshold, it is determined that the kickback occurs in the power tool. Alternatively, after the acceleration data is detected to exceed the first acceleration threshold for the first time, if 90% of the acceleration data within 1 sec. is detected to exceed the first acceleration threshold, it is determined that the kickback occurs in the power tool.

The control module 37 starts the time window every time the acceleration data exceeding the first acceleration threshold is detected, and the time windows may be overlapped. For example, the control module 37 detects that the acceleration data exceeds the first acceleration threshold for the first time at the 2 second after the power tool starts working, and starts a first time window whose length is 500 ms; the control module detects that the acceleration data exceeds the first acceleration threshold for the second time at the 2.2 second, and starts the second time window. In the first time window, more than 50% of the acceleration data exceeds the first acceleration threshold, and in the second time window, more than 80% acceleration data exceeds the first acceleration threshold. The preset ration is 85%, so the control module 37 will determine that the kickback occurs in the power tool at the end of the second time window, i.e., at the 2.7 second mark.

Since the power tool in this example uses a sliding detection window to detect the tangential acceleration of the power tool, the kickback detection for the power tool is more accurate and the influence of the vibration generated when the power tool is working normally on the kickback detection is weakened or eliminated.

It should be noted that the control module 37 may be any module or circuit having processing ability, such as a microcontroller unit (MCU), a single-chip microcomputer and the like. In addition, the control module 37 and the acceleration sensor 36 may further be electrically connected to the power supply module 32 and powered by the power supply module 32.

According to the power tool in this example, the acceleration data of the power tool in a tangential direction is collected by an acceleration sensor, and it is determined that a kickback occurs in the power tool when a proportion of the acceleration data exceeding the first acceleration threshold in a preset time window exceeds a preset value, making the power tool kickback detection more accurate and avoiding the influence of the vibration generated when the power tool is working normally on the kickback detection.

Furthermore, in the example illustrated in FIG. 3, the control module 37 may further control the electric motor 33 to stop rotating or control the power supply module 32 to stop supplying power to the electric motor 33 after determining that a kickback occurs in the power tool. The control module 37 may stop the power tool by stopping the rotation of the electric motor 33. Alternatively, the control module 37 may directly cut off the electrical connection between the electric motor 33 and the power supply module 32, thereby stopping the power tool. Furthermore, the control module 37 may include a processor and a controller. The processor is configured to collect the acceleration date detected by the acceleration sensor 36 and determine whether the kickback occurs. When the processor detects that a kickback occurs in the power tool, the processor sends a signal to the controller and the controller controls the power tool to stop working. The controller, for example, may be a in a form of a switch disposed between the electric motor 33 and the power supply module 32. Normally, the switch is in an on state. When the controller receives the signal sent by the processor, the electric motor 33 is disconnected from the power supply module 32, so that the power tool stops rotating.

In order to avoid the influence of the vibration generated in the tangential direction on the kickback detection when the power tool is working normally, the control module 37 is further configured to low-pass filter the acceleration data detected by the acceleration sensor 36 before processing the acceleration data, so as to obtain the filtered acceleration data. The acceleration data may include mutation data indicating large acceleration in the normal vibration generated by the power tool. However, in the normal vibration, the mutation acceleration data is not continuous, so that some mutation vibrations are filtered out by the low-pass filtering. The low-pass filtering may be a first-order low-pass filtering or a second-order low-pass filtering and the filtering parameters of the low-pass filtering are also selected according to the working characteristics of the power tool as long as the mutation acceleration data generated by the vibration is filtered out. The control module 37 determines, in response to detecting the filtered acceleration data exceeds a second acceleration threshold, whether a proportion of the filtered acceleration data exceeding the second acceleration threshold in the preset time window exceeds the preset value, so as to determine whether kickback occurs in the power tool. The amplitude of the acceleration data will be changed in the filtering. That is, the amplitude of the acceleration data decreases in the filtering and becomes smoother than the amplitude before filtering. Therefore, the control module 37 determines whether the proportion of data exceeding the second acceleration threshold in the filtered acceleration data in the preset time window exceeds the preset value, and the specific determining method is as same as the method in the example illustrated in FIG. 3, which is not repeated herein.

Furthermore, in order to reduce the calculation amount of the control module 37 and increase the calculation speed, the control module 37 is further configured to, after low-pass filtering the acceleration data and obtaining the filtered acceleration data, discretize the filtered acceleration data to obtain the discrete data of the acceleration. The method for discretizing the acceleration may be any one of data discretization methods, but the data after discretization needs to be sufficient to meet the needs of determining the kickback in the power tool. For example, the filtered acceleration data may be discretized to obtain one discrete acceleration data every 50 ms. The control module 37 determines, in response to detecting the discrete data exceeds a second acceleration threshold, whether the quantity of the discrete data exceeding the second acceleration threshold in the preset time window exceeds the preset value. For example, when one discrete acceleration data exists in every 50 ms, each time window includes 10 discrete acceleration data, and the preset time window is 500 ms, if the preset ratio is 80%, it is determined that the kickback occurs in the power tool when one preset time window includes 8 or more discrete data exceeding the second acceleration threshold.

The acceleration sensor 36 may be a digital sensor whose detected acceleration data is a numerical signal, that is, a discrete signal. In this case, the acceleration data detected by the acceleration sensor 36 is a series of discrete values. When the detection module 37 detects that one acceleration data exceeds the first acceleration threshold, the determination logic is triggered to determine whether the proportion of the acceleration data exceeding the first acceleration threshold in the preset time window exceeds the preset value; and if the proportion exceeds the preset value, a kickback occurs in the power tool.

If the acceleration sensor 36 is an analog sensor, the detected acceleration data is an analog signal. Since large calculation amount is required for processing the analog signal, the acceleration data may be filtered after being obtained and the filtered acceleration data is discretized so as to obtain the discrete data. When the discrete acceleration data is a series of discrete values and when the detection module 37 detects that one acceleration data exceeds the first acceleration threshold, the determination logic is triggered to determine whether the proportion of the acceleration data exceeding the first acceleration threshold in the preset time window exceeds the preset value; and if the proportion exceeds the preset value, a kickback occurs in the power tool.

Figure 4:
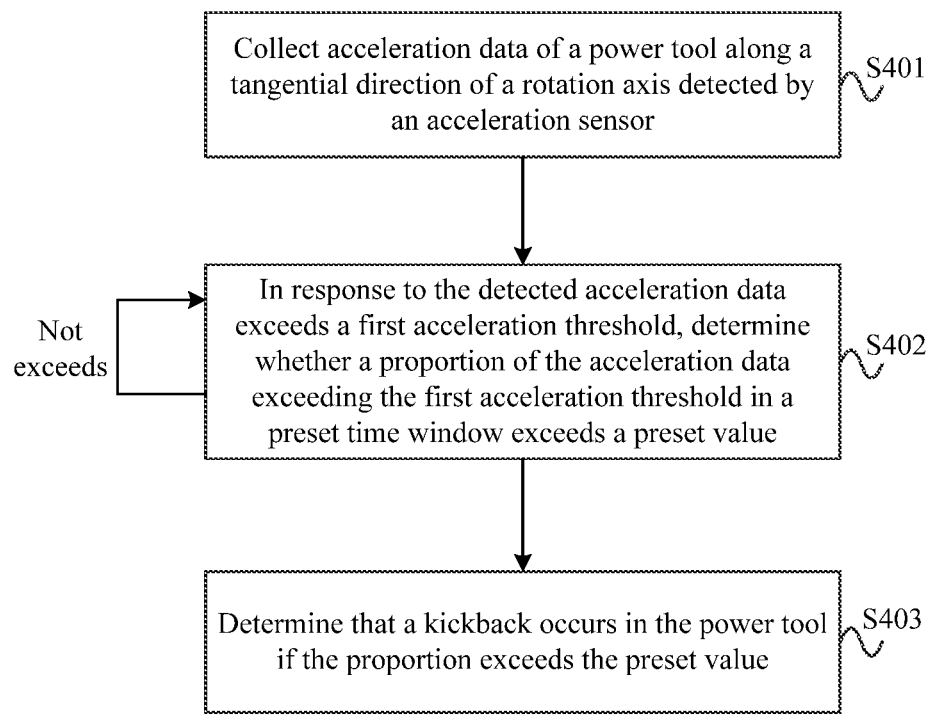
FIG. 4 is a flowchart of an example kickback detection method.

FIG. 4 is a flowchart of an example kickback detection method for the power tool. As shown in FIG. 4, this method includes the following steps.

In step S401, the acceleration data, detected by an acceleration sensor, of a power tool along a tangential direction of a rotation axis is collected.

In step S402, in response to detecting the acceleration data exceeds a first acceleration threshold, whether a proportion of the acceleration data exceeding the first acceleration threshold in a preset time window exceeds a preset value is determined. If the proportion does not exceed the preset value, the method returns to the step S402.

In step S403, it is determined that a kickback occurs in the power tool if the proportion exceeds the preset value.

The specific detection process of the kickback detection method provided in this example is described with reference to the power tool illustrated in FIG. 3 which is not repeated herein.

Furthermore, in the example illustrated in FIG. 4, the detected acceleration data is a numeric signal.

Furthermore, in the example illustrated in FIG. 4, when the acceleration data is detected to exceed the first acceleration threshold, before determining whether a proportion of the acceleration data exceeding the first acceleration threshold in a preset time window exceeds a preset value, the method further includes: filtering the acceleration data and discretizing the filtered acceleration data to obtain discrete data of acceleration; in response to detecting the discrete data exceeds the first acceleration threshold, determining whether a proportion of the discrete data exceeding the first acceleration threshold in the preset time window exceeds the preset value, and determining that a kickback occurs in the power tool if the proportion exceeds the preset value.

Figure 5:
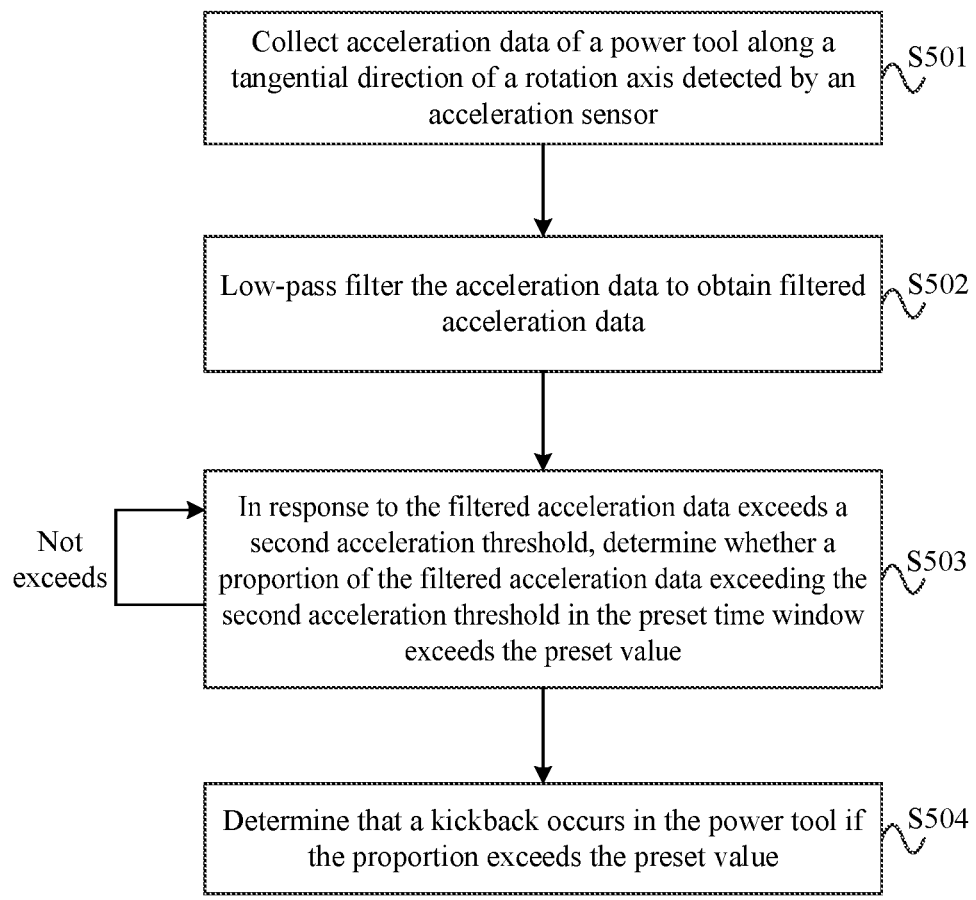
FIG. 5 is also a flowchart of an example kickback detection method.

FIG. 5 is also a flowchart of a kickback detection method for a power tool. As shown in FIG. 5, this method includes the following steps.

In step S501, the acceleration data, detected by an acceleration sensor, of a power tool along a tangential direction of a rotation axis is collected.

In step S502, the acceleration data is low-pass filtered to obtain the filtered acceleration data.

In step S503, in response to detecting the filtered acceleration data exceeds a second acceleration threshold, whether a proportion of the filtered acceleration data exceeding the second acceleration threshold in the preset time window exceeds the preset value is determined. If the proportion does not exceed the preset value, the method returns to the step S503.

In step S504, a kickback is determined to occur in the power tool if the proportion exceeds the preset value.

The influence of the vibration generated when the power tool is working normally on the kickback detection is eliminated after the acceleration data is low-pass filtered, thereby improving the accuracy of the power tool kickback detection.

Figure 6:
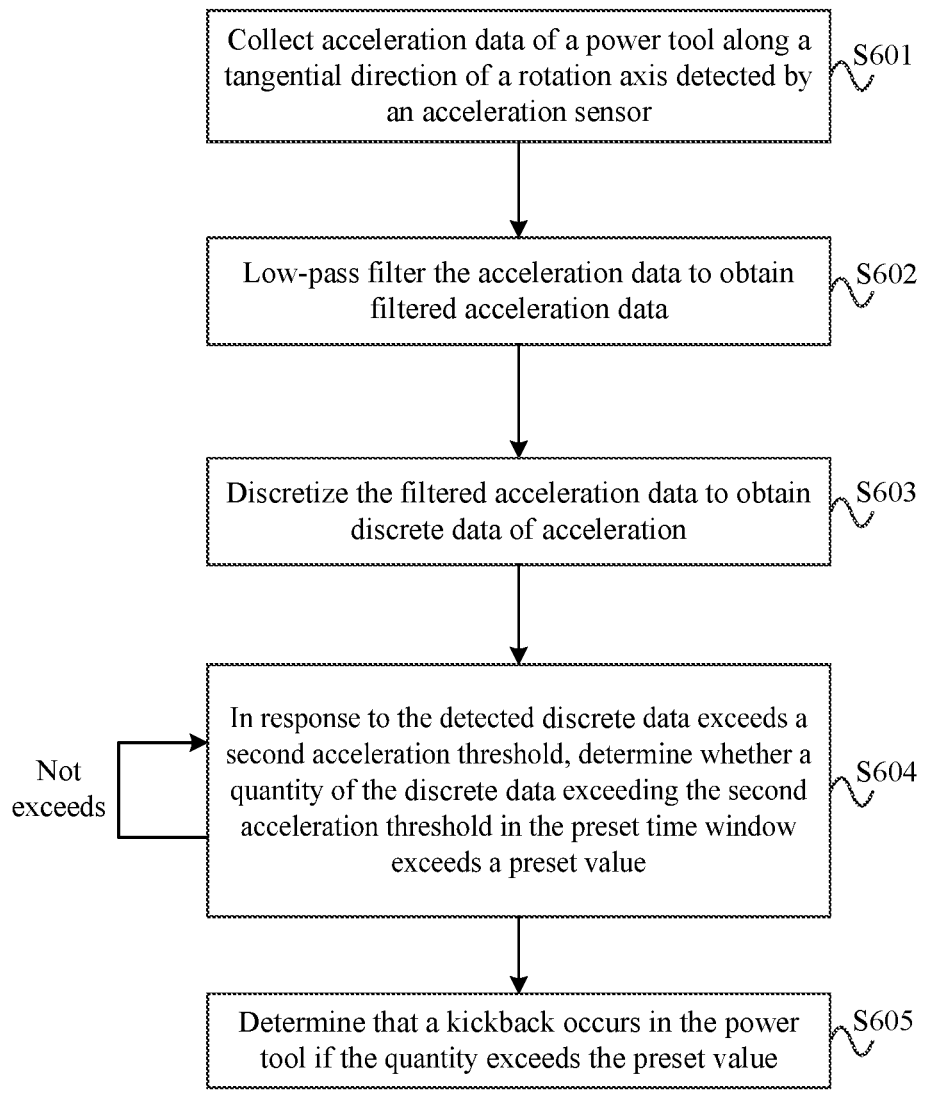
FIG. 6 is also a flowchart of an example kickback detection method.

FIG. 6 is also a flowchart of a kickback detection method for a power tool. As shown in FIG. 6, this method includes the following steps.

In step S601, the acceleration data, detected by an acceleration sensor, of a power tool along a tangential direction of a rotation axis is collected.

In step S602, the acceleration data is low-pass filtered to obtain the filtered acceleration data.

In step S603, the filtered acceleration data is discretized to obtain the discrete data of acceleration.

In step S604, in response to detecting the discrete data exceeds a second acceleration threshold, whether the quantity of the discrete data exceeding the second acceleration threshold in the preset time window exceeds the preset value is determined. If the quantity does not exceed the preset value, the method returns to the step S604.

In step S605, a kickback is determined to occur in the power tool if the quantity exceeds the preset value.

The influence of the vibration generated when the power tool is working normally on the kickback detection is filtered out, the calculation amount of the kickback detection is reduced and the efficiency of the kickback detection is improved after the acceleration data is low-pass filtered and discretized, thereby improving the accuracy and the speed of the power tool kickback detection.

Furthermore, in the examples illustrated in FIG. 4 to FIG. 6, the collecting of the acceleration data of the power tool along the tangential direction of the rotation axis may include collecting the acceleration data of the power tool along the tangential direction of the rotation axis by an MEMS acceleration sensor. Due to the low cost and high detection accuracy of the MEMS acceleration sensor, the detection accuracy of the tangential acceleration is improved and the cost of the power tool is reduced.

Furthermore, in the examples illustrated in FIG. 4 to FIG. 6, the electric motor may be controlled to stop rotating after determining that the kickback occurs in the power tool.

Figure 7:
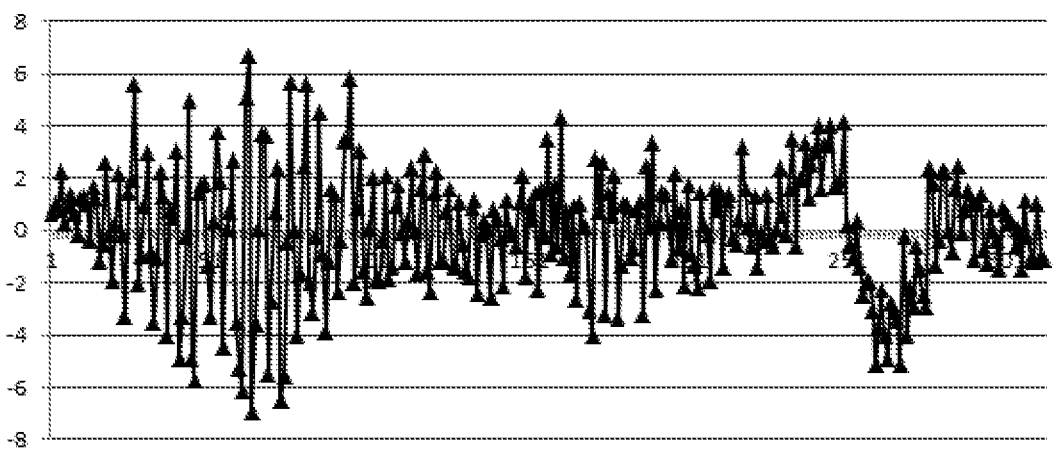
FIG. 7 is a schematic diagram of a tangential acceleration, detected by an acceleration sensor of a power tool.
Figure 8:
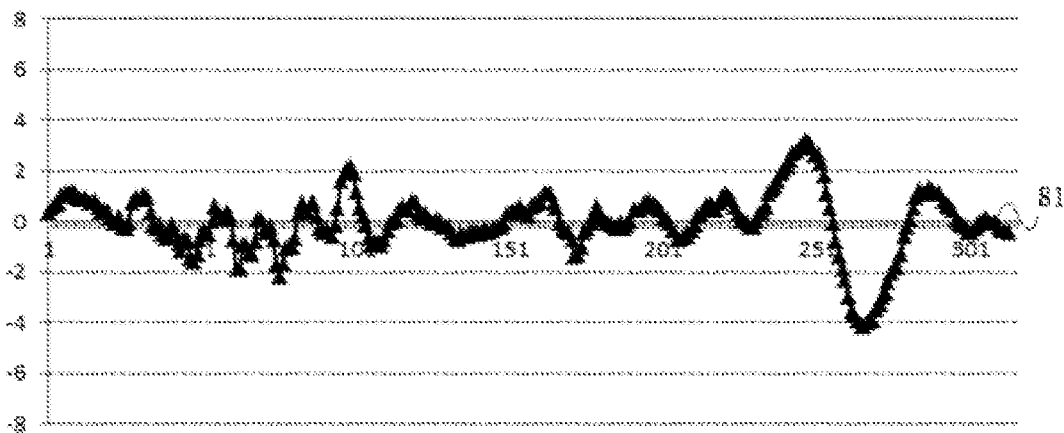
FIG. 8 is a schematic diagram of low-pass filtered, acceleration data in FIG. 7.
Figure 9:
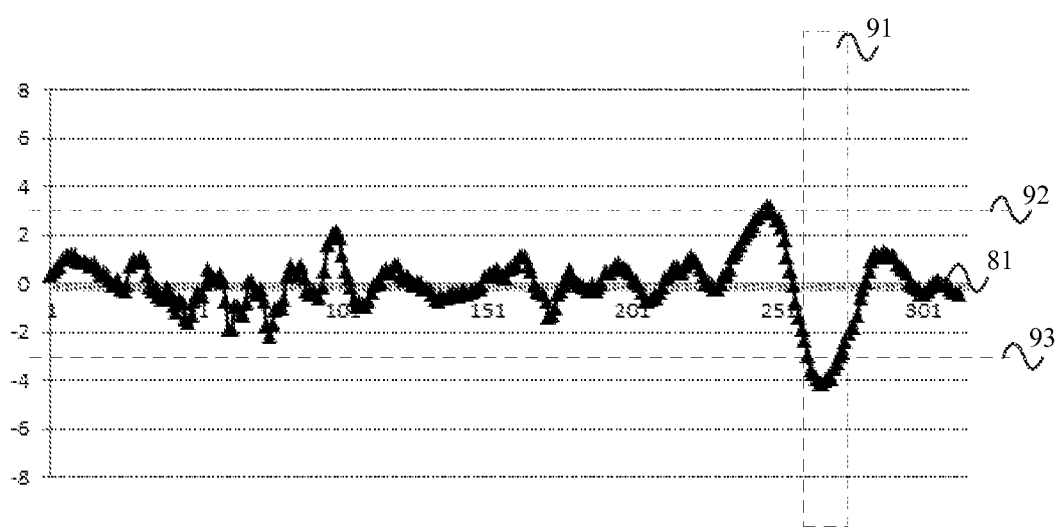
FIG. 9 is a schematic diagram of a kickback detection using a sliding time window.

FIG. 7 to FIG. 9 are schematic diagrams showing the detection effect of the kickback detection by using the kickback detection methods provided herein. FIG. 7 is a schematic diagram of a tangential acceleration of the power tool detected by the acceleration sensor. In FIG. 7, the unit of the vertical axis is g, 1 g=9.8 m/s$^2$, and the horizontal axis is the corresponding data point after the data is discretized. FIG. 8 is a schematic diagram of acceleration data in FIG. 7 after low-pass filtered. In FIG. 8, the curve 81 is the low-pass filtered acceleration data. FIG. 9 is a schematic diagram of the kickback detection using a sliding time window. In FIG. 9, the window 91 is a preset time window which includes 10 discrete acceleration data and the line 92 and the line 93 parallel to the horizontal axis are second acceleration thresholds. In the window 91, 7 discrete acceleration data exceed the second acceleration threshold and whether a kickback occurs in the power tool is determined according to a preset value.

It is to be noted that, in view of the technical details set forth herein, those skilled in the art will be able to make various modifications, adaptations and substitutions without departing from the scope of the present disclosure. Therefore, while the present disclosure has been described in detail through the above-mentioned examples, the present disclosure is not intended to be limited to the above-mentioned examples and may include other equivalent embodiments without departing from the concept of the present disclosure. The scope of the present disclosure is therefore to be determined by the scope of the appended claims.

What is claimed is:

1. A detection method for a power tool, comprising:
collecting a plurality of acceleration data points within a preset time window, via use of an acceleration sensor of the power tool, along a tangential direction of a rotation axis of a working portion of the power tool, wherein each of the plurality of acceleration data points is a digital signal;
calculating a proportion representative of the number of collected acceleration data points whose acceleration value exceeds a first acceleration threshold to the total number of collected acceleration data points within the preset time window, wherein the acceleration data points whose acceleration exceeds a first acceleration threshold may be non-adjacent acceleration data points;
determining whether the calculated proportion exceeds a preset proportion value; and
determining that a kickback occurs in the power tool when the calculated proportion exceeds the preset proportion value.

2. The method according to claim 1, wherein the digital signal is representative of a numeric value.

3. The method according to claim 1, wherein determining whether the calculated proportion exceeds the preset proportion value comprises filtering the collected plurality of acceleration data points and discretizing the filtered acceleration data points to obtain discrete data of acceleration and determining whether a proportion of the discrete data exceeding the first acceleration threshold in the preset time window exceeds the preset proportion value.

4. The method according to claim 1, wherein determining whether the calculated exceeds the preset value comprises low-pass filtering the collected plurality of acceleration data points to obtain filtered acceleration data and determining whether a proportion of the filtered acceleration data exceeding a second acceleration threshold in the preset time window exceeds the preset proportion value.

5. The method according to claim 1, further comprising controlling the power tool to stop rotation after determining that a kickback occurs in the power tool.

6. The method according to claim 2, further comprising controlling the power tool to stop rotation after determining that a kickback occurs in the power tool.

7. The method according to claim 3, further comprising controlling the power tool to stop rotation after determining that a kickback occurs in the power tool.

8. The method according to claim 4, further comprising controlling the power tool to stop rotation after determining that a kickback occurs in the power tool.

9. A power tool, comprising:
a housing, a power supply module, an electric motor, a control switch, a working portion, an acceleration sensor and a control module, wherein the power supply module, the electric motor, the control switch, the acceleration sensor and the control module are disposed in the housing, the power supply module is electrically connected to the electric motor via the control switch and configured to supply power to the electric motor according to control of the control switch to drive the electric motor to rotate, the electric motor is fixedly connected to the working portion and configured to drive the working portion to rotate when the electric motor is rotating,
the acceleration sensor is configured to detect acceleration along a tangential direction of a rotation axis of the working portion when the working portion is rotating, and the control module is electrically connected to the acceleration sensor and configured to:
collect discrete acceleration data points detected by the acceleration sensor during a preset time window;
calculate a proportion representative of the number of collected acceleration data points that exceeds a first acceleration threshold to the total number of discrete acceleration data points collected;
determine whether the proportion exceeds a preset proportion value; and
determine that a kickback occurs in the power tool when the proportion exceeds the preset proportion value, even when at least one of the discrete acceleration data points detected during the preset time window is below the first acceleration threshold.

10. The power tool according to claim 9, wherein the detected acceleration is a numeric signal.

11. The power tool according to claim 9, wherein the control module is further configured to filter the collected acceleration data points and discretize the filtered acceleration data points to obtain discrete data of acceleration and determining whether a proportion of the collected acceleration data that exceeds a first acceleration threshold in a preset time window exceeds a preset value comprises determining whether a proportion of the discrete data exceeding the first acceleration threshold in the preset time window exceeds the preset proportion valued.

12. The power tool according to claim 9, wherein the control module is further configured to low-pass filter the collected acceleration data points to obtain filtered acceleration data points and determining whether a proportion of the collected acceleration data that exceeds a first acceleration threshold in a preset time window exceeds a preset value comprises determining whether a proportion of the filtered acceleration data exceeding a second acceleration threshold in the preset time window exceeds the preset proportion value.

13. The power tool according to claim 9, wherein the control module is further configured to control the electric motor to stop rotating or control the power supply module to stop supplying power to the electric motor after determining that the kickback occurs in the power tool.

14. The power tool according to claim 10, wherein the control module is further configured to control the electric motor to stop rotating or control the power supply module to stop supplying power to the electric motor after determining that the kickback occurs in the power tool.

15. The power tool according to claim 11, wherein the control module is further configured to control the electric motor to stop rotating or control the power supply module to stop supplying power to the electric motor after determining that the kickback occurs in the power tool.

16. The power tool according to claim 12, wherein the control module is further configured to control the electric motor to stop rotating or control the power supply module to stop supplying power to the electric motor after determining that the kickback occurs in the power tool.

* * * * *